3,009,929
9,11-HALOGENATED PROGESTINS
Hans Reimann, Bloomfield, and David H. Gould, Leonia, N.J., assignors to Schering Corporation, Bloomfield, N.J., a corporation of New Jersey
No Drawing. Filed May 29, 1961, Ser. No. 113,091
26 Claims. (Cl. 260—397.3)

This invention relates to novel and therapeutically useful halogenated steroids and to methods for their manufacture. In particular, this invention relates to 6,17,21-trisubstituted-9α,11β-dihalogenated derivatives of progesterone which exhibit valuable progrestational properties.

Our novel compounds may be represented by the following formula:

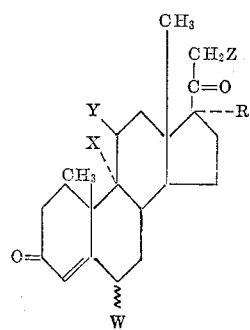

wherein X is a halogen having an atomic weight greater than 19; Y is a halogen having an atomic weight less than 126 and being at least as electronegative as X; R is a member of the group consisting of bromine, hydroxy and acyloxy; W is a member of the group consisting of hydrogen and methyl; Z is halogen preferably fluorine or iodine; and the 1-dehydro analogs thereof. The bond designated by the wavy line ($\sim$) in the above formula indicates that the substituent at the 6-carbon may be in an α- or β-position. In this application whenever the configuration at 6 is not specifically designated as α or β, both configurations are included. These novel compounds are thus 9,11,17,21-tetrahalogenated analogs and 17-acyloxy-9,11,21-trihalogenated analogs of progesterone, 19-norprogesterone and 1-dehydroprogesterone, and their 6α-methyl and 6β-methyl analogs.

Illustrative of the 17α-acyl groups in the 17α-acyloxy derivatives contemplated by our invention are lower alkanoates such as formate, acetate, propionate, butyrate, isobutyrate, valerate, isovalerate, pivalate, crproate, enanthate; substituted alkanoates such as β-cyclopentylpropionate, cyclohexylacetate, ethoxyacetate, phenylacetate, phenoxyacetate; unsaturated acyl radicals such as acrylate and crotonate, aromatic acyl radicals such as benzoate and toluate, as well as the residues of dibasic acids such as succinate and phthalate and of fatty acids such as undecanoate and laurate. The term "lower alkanoate" thus includes acyl radicals of monocarboxylic and dicarboxylic acids containing up to 12 carbon atoms.

In the following specification, unless otherwise indicated, it is to be understood that the discussions of compounds and reactions of compounds having no substituent at C–6, other than hydrogen, are equally applicable to the 6α- and 6β-methyl analogs.

Typical progestins embraced by the general formula are 9α,11β - dichloro-21-fluoro-17α-hydroxyprogesterone 17-acetate; 9α,11β - dichloro-21-iodo-17α-hydroxyprogesterone 17 - acetate; 9α-bromo-11β,21-difluoro-17α-hydroxyprogesterone 17 - acetate; 9α-iodo-11β-chloro-21-fluoro-17α-hydroxyprogesterone 17 acetate; 9α,17α-dibromo-11β,21-difluoroprogesterone; as well as their 1-dehydro analogs. Although our compounds (with the exception of 17-hydroxy substituted compounds which are valuable as intermediates) are, in general, valuable progestins, the 17α-acyloxy-21-fluoroprogesterones of the general formula are the preferred species and, in particular, 9α,11β-dichloro-21-fluoro-17α - hydroxyprogesterone 17-acetate.

Our novel compounds are prepared by reacting a 4,9(11)-pregnadiene-3,20-dione substituted at the 17-carbon by acyloxy, bromine and at the 21-carbon preferably by fluorine or iodine (or a similarly substituted 1,4,9(11)-pregnatriene-3,20-dione) with a suitable halogenating agent. The starting compounds utilized in this invention are therefore exemplified by compounds such as 17α-hydroxy-21-fluoro-4,9(11)-pregnadiene-3,20 - dione 17-acetate, 17α - hydroxy-21-iodo-4,9(11)-pregnadiene-3,20-dione 17-acetate, 17α-bromo-21-fluoro-4,9(11)-pregnadiene-3,20-dione as well as the 1-dehydro analogs of the foregoing.

Other 9(11)-dehydro starting materials, such as the 6-methyl substance, are prepared through 6,17-disubstituted-11,21-dihydroxylated progesterones. For example, 6α-methyl-17α-acetoxy - 21 - iodo-4,9(11)-pregnadiene-3,20 - dione (6α-methyl-17α-acetoxy-21-iodo-9(11)-dehydroprogesterone) is prepared from 6α-methyl-11β,17α,21-trihydroxy-4-pregnene-3,20-dione 21-acetate (6α-methylhydrocortisone 21-acetate) by an initial dehydration effected by a reagent such as methanesulfonyl chloride in the presence of pyridine or phosphorus oxychloride in pyridine to yield 6α-methyl-17α,21-dihydroxy-4,9(11)-pregnadiene-3,20-dione 21-acetate. The 21-acetate ester is converted to a 21-sulfonate ester by initial hydrolysis of the 21-acetate with, for example, methanolic perchloric acid to give 6α-methyl-17α,21-dihydroxy-4,9(11)-pregnadiene-3,20-dione followed by subsequent treatment of the 21-hydroxy compound with a sulfonyl chloride such as p-toluenesulfonyl chloride. Treatment of the 6α-methyl - 17α - 21 - dihydroxy-4,9(11)-pregnadiene-3,20-dione 21-p-toluenesulfonate thus produced with, for example, sodium iodide in acetone yields 6α-methyl-17α-hydroxy-21-iodo-4,9(11)-pregnadiene-3,20 - dione (6α-methyl-17α-hydroxy-21-iodo - 9(11) - dehydroprogesterone). Esterification of the 17-hydroxyl groups by procedures heretofore described yields requisite starting pregnadienes for our process such as 6α-methyl-17α-acetoxy-21 - iodo - 4,9(11)-pregnadiene-3,20-dione (6α-methyl-17α-hydroxy-21-iodo-9(11)-dehydroprogesterone 17-acetate).

When an 11-hydroxy intermediate is not available, as in the case of 11β-hydroxy-17α-bromoprogesterone, the hydroxyl group is introduced, microbiologically, into the 11-desoxy analog, 17α-bromoprogesterone, by means of a microorganism such as *Curvularia lunata* (N.R.R.L. 2380) by procedures analogous to those described in United States Patent No. 2,658,023. The 11β-hydroxy-17α-bromoprogesterone thus produced upon treatment with, for example, lithium bromide in glacial acetic acid, yields 17α-bromo-4,9(11)-pregnadiene-3,20-dione (17α-bromo-9(11)-dehydroprogesterone) which is subsequently treated with iodine and calcium oxide, for example, to introduce a 21-iodo group to give a requisite intermediate of our process, 17α-bromo-21-iodo-9(11)-dehydroprogesterone.

Our 9(11)-dehydro starting compounds may also be prepared by introducing an 11α-hydroxyl group into an 11-desoxy progesterone through the action of a microorganism such as *Rhizopus nigricans* (A.T.T.C. 6227b) using procedures analogous to those described in United States Patent No. 2,602,769. Subsequent treatment of the 11α-hydroxyprogesterone derivative so obtained with a sulfonyl chloride such as methanesulfonyl chloride or toluenesulfonyl chloride yields the corresponding 11α- sulfonate which when treated with a base such as pyridine gives the desired 9(11)-dehydroprogesterone derivative.

17α-substituted-21-fluoro intermediates, 17α-bromo-21-fluoro-9(11)-dehydroprogesterone, and 17α-acyloxy-21-fluoro-9(11)-dehydroprogesterones such as, for example, 17α - hydroxy-21-fluoro - 9(11)-dehydroprogesterone 17-acetate are conveniently obtained from their corresponding 21-iodo compounds by the action of, for example, silver fluoride in moist acetonitrile. The analogous 21-chloro- and 21-bromo compounds are obtained by similar reaction with silver chloride or silver bromide respectively.

The 1-dehydro intermediates, such as the following compounds and their 6-methyl analogs, 17α-bromo-21-fluoro-1,4,9(11)-pregnatriene-3,20-dione (17α-bromo-21-fluoro-1,9(11)-bisdehydroprogesterone) and 17α-bromo-21 - iodo-1,4,9(11)-pregnatriene-3,20-dione (17α-bromo-21-iodo-1,9(11)-bisdehydroprogesterone), and 17α-acyloxy-21-halogeno-pregnatrienes such as 17α-hydroxy-21-iodo-1,4,9(11)-pregnatriene-3,20-dione 17-acetate (17α-hydroxy-21-iodo-1,9(11)-bisdehydroprogesterone 17-acetate) and 17α-hydroxy-21-fluoro-1,4,9(11)-pregnatriene-3,20-dione 17 - acetate (17α - hydroxy-21-fluoro-1,9(11)-bisdehydroprogesterone 17-acetate) are prepared from the corresponding 17α - bromo-21-halogeno-9(11)-dehydroprogesterones and 17α-acyloxy-21-halogeno-9(11)-dehydroprogesterones by microbiological dehydrogenation with an organism such as, for example, (*Corynebacterium simplex* (A.T.C.C. 6946) in a manner similar to that described in United States Patent No. 2,837,464, or by chemical dehydrogenation through the use of such reagents as chloranil or selenium dioxide.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used along or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteratomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such N-chlorosuccinimide, N-bromoacetamide, dimethyl-N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as obtained from N-bromo-succinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source, it may be present in large excess. Such an excess of anion is frequently useful to obtain an increased yield or greater purity of product.

Thus, each of our novel compounds may be prepared by any one of several methods. For example, 17α-hydroxy-21-fluoro-9α,11β - dichloroprogesterone 17-acetate may be prepared from 17α-hydroxy-21-fluoro-9(11)-dehydrogesterone 17 acetate by utilizing such reagents and combinations as: (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

An alternate route for preparing 17α-acyloxy-21-halogenated compounds falling under the general formula is by halogenating a 17α-hydroxy-21-halogeno-9(11)-dehydroprogesterone (or the 1-dehydro analog) by any of the above described halogenating methods of our invention, with subsequent esterification of the 9α,11β-dihalogeno-17α-hydroxyprogesterone (or the 1-dehydro analog) thereby obtained. In this manner, 17α-hydroxy-21-iodo-9(11)-dehydroprogesterone, prepared from the known 17α - hydroxy - 21 - bromo-9(11)-dehydroprogesterone as shown in Example 1, upon chlorination with a reagent such as chlorine in carbon tetrachloride in the presence of pyridine yields 9α,11β-dichloro-21-iodo-17α-hydroxyprogesterone which when esterified with acetic acid and trifluoroacetic anhydride, for example, gives 9α,11β-dichloro - 21 - iodo-17α-hydroxyprogesterone 17-acetate. Other acids may be substituted for acetic acid in the esterification step to obtain the corresponding 17α-acyloxy dihalogenated progesterone.

Our novel halogenating process is also useful in preparing the 1-dehydro compounds failling under the general formula. Thus, a 6,17,21-trisubstituted-9α,11β-dihalogeno-1-dehydroprogesterone falling under the general formula such as, for example, 6α-methyl-17α-bromo-21-fluoro-9α,11β-dichloro-1-dehydroprogesterone is prepared from 6α-methyl-17α-bromo-21-fluoro-1,9(11)-bisdehydroprogesterone by utilizing any one of the six reagents and combinations listed previously.

In addition, our novel 1-dehydrohalogenated progesterones are obtained from the corresponding halogenated progesterones by microbiological or chemical dehydrogenation techniques as heretofore described.

Our process, whereby a 17α,21-disubstituted-9(11)-dehydroprogesterone is converted to a 17α,21-disubstituted-9α,11β-dihalogeno derivative, is generally carried out in the presence of a non-reacting solvent at temperatures ranging from 5° C. to 50° C. with reaction times varying from one-half hour to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above described process in a halogenated hydrocarbon solvent such as methylene chloride, chloroform or carbon tetrachloride, the yield and purity of the dihalogenated progesterone obtained is greatly increased by adding pyridine to the reaction mixture. Preferably up to ten equivalents of pyridine are added and usually one to four, based on the amount of steroid being converted. Other organic basic agents which may also be used in conjunctions with a halogenated hydrocarbon solvent are aromatic tertiary amines such as lutidine, collidine, alkyl substituted pyridines and the like. The reaction is usually carried out initially at −20° C. with subsequent warming to about room temperature. The reaction time may be as short as five minutes or as long as several hours. In general, the optimum reaction time is about one hour.

Our process whereby a 17,21-disubstituted-9(11)-dehydroprogesterone is converted to a 17,21-disubstituted-9α,11β-dihalogenoprogesterone is also applicable to 17,21-disubstituted-9(11)-dehydro-19-norprogesterones. With the aforementioned 9(11)-dehydro-19-norprogesterones there are produced the novel progestational agents, 9α-X-11β-Y-17α-R-21-Z-19-norprogesterones wherein R, X, Y and Z are as heretofore described. Thus, 17α-bromo-21-fluoro-4,9(11)-19-norpregnadiene-3,20-dione (17α-bromo-21-fluoro-9(11)-dehydro-19-norprogesterone) and 17α-bromo-21-iodo-4,9(11)-19-norpregnadiene-3,20-dione (17α-bromo-21-iodo-9(11)-dehydro-19-norprogesterone) when reacted with chlorine in carbon tetrachloride in the presence of pyridine, for example, are converted to their respective 9α,11β-dichloro derivatives.

When preparing a 9,11,21-trihalogenated-17α-acyloxy-19-norprogesterone by our process, the halogenation step is preferably performed on the corresponding 17α-hydroxy-9(11)-dehydro intermediates prior to esterification of the 17-hydroxy group. Thus, 17α-hydroxy-9(11)-dehydro-19-norprogesterones such as 17α-hydroxy-21-fluoro-4,9(11)-19-norpregnadiene-3,20-dione (17α-hydroxy-21-fluoro-9(11)-dehydro-19-norprogesterone) and 17α-hydroxy-21-iodo-4,9(11)-19-norpregnadiene-3,20-dione (17α-hydroxy-21-iodo-9(11)-dehydro-19-norprogesterone) are first converted to the corresponding 9,11,21-trihalogenated-17α-hydroxy-19-norprogesterones which are then esterified by methods heretofore described to give the corresponding 9,11,21-trihalogenated-17α-acyloxy-19-norprogesterones.

The necessary 19-nor-intermediates, i.e., the 17α,21-disubstituted-9(11)-dehydro-19-norprogesterones are prepared by using procedures analogous to those known in the art. For example, a 21-iodo group is introduced into a 17-substituted-19-norprogesterone such as the known 17α-hydroxy-19-norprogesterone by means of iodine and calcium oxide as described heretofore, yielding the 17α,21-disubstituted-19-norprogesterone, 17α-hydroxy-21-iodo-19-norprogesterone. The 21-iodo-19-nor compounds are easily converted to the corresponding 21-fluoro intermediates by means of a reagent such as silver fluoride in moist acetonitrile yielding intermediates such as 17α-hydroxy-21-fluoro-19-norprogesterone. The double bond between C–9 and C–11 is then introduced into a 17,21-disubstituted-19-norprogesterone such as 17α-hydroxy-21-fluoro-19-norprogesterone and 17α-hydroxy-21-iodo-19-norprogesterone through the corresponding 11-hydroxy derivative which is prepared, for example, by means of microorganisms such as *Curvularia lunata* (N.R.R.L. 2380) or *Rhizopus nigricans* (A.T.C.C. 6227b). The 17,21-disubstituted-11-hydroxy-19-norprogesterones thus prepared are dehydrated by procedures described heretofore to give the necessary intermediates such as, for example, 17α-hydroxy-21-fluoro-9(11)-dehydro-19-norprogesterone and 17α-hydroxy-21-iodo-9(11)-dehydro-19-norprogesterone.

Our novel 17α,21-disubstituted dihalogenated progesterones, the 19-nor and 1-dehydro analogs, except those having a hydroxy group at C–17, are active progestational agents by both oral and intramuscular routes, being specific in their action and devoid of androgenic, estrogenic and corticoid activity. That our compounds have progestational activity at all is surprising in view of the art which teaches that the introduction of substituents into the C-ring of progesterone and its derivatives, such as for example, 11β-hydroxyprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The 17α-hydroxy-9,11,21-trihalogenated progesterones falling under the general formula are valuable as intermediates in the preparation of the 17α-acyloxy-9,11,21-trihalogenated progesterones, which are active progestational agents. In addition, the 17α-hydroxy-21-fluoro-9,11,dihalogenated progesterones produced by our process, and particularly, the 1-dehydro analog, possess anti-inflammatory activity, thus rendering these compounds therapeutically valuable per se.

The following examples are illustrative of the procedures employed in preparing the compounds of this invention, but are not to be construed as limiting the scope thereof; the scope of our invention being limited only by the appended claims.

EXAMPLE 1

*17α-hydroxy-21-iodo-4,9(11)-pregnadiene-3,20-dione*

To a solution of 10 g. of 21-bromo-4,9(11)-pregnadiene-3,20-dione-17α-ol in 200 ml. of acetone containing a few drops of pyridine is added a solution of 5 g. of sodium iodide in 20 ml. of acetone. The mixture is warmed on the steam-bath for 15 minutes, then poured into water.

A solid separates which is filtered and crystallized from acetone-hexane to give 17α-hydroxy-21-iodo-4,9(11)-pregnadiene-3,20-dione, $\lambda_{max.}^{MeOH}$ 239 mμ

EXAMPLE 2

*17α-hydroxy-21-iodo-4,9(11)-pregnadiene-3,20-dione 17-acetate*

A solution of 2.0 g. of 17α-hydroxy-21-iodo-4,9(11)-pregnadiene-3,20-dione (the compound of Example 1) in 20 ml. of acetic acid and 4 ml. of trifluoroacetic anhydride is allowed to stand at room temperature for 16 hours. It is then poured into ice-water. A solid separates, which is filtered, washed with water, and crystallized from acetone-hexane to give 17α-hydroxy-21-iodo-4,9(11)-pregnadiene-3,20-dione 17-acetate.

EXAMPLE 3

*9α,11β-dichloro-21-iodo-17α-hydroxyprogesterone 17-acetate*

A. One gram of 17α-hydroxy-21-iodo-4,9(11)-pregnadiene-3,20-dione 17-acetate (the compound of Example 2) is dissolved in 30 ml. of carbon tetrachloride to which is added at −20° C. a solution of 145 mg. of chlorine gas in 3 ml. of carbon tetrachloride and 0.2 ml. of pyridine. The mixture is stirred at −20° C. for 15 minutes, then allowed to warm to room temperature over a period of ½ hour. The solution is filtered, and the filtrate concentrated in vacuo to a residue which upon trituration with ether yields a solid which is crystallized from acetone-hexane to give 9α,11β-dichloro-21-iodo-17α-hydroxyprogesterone 17-acetate, $\lambda_{max.}^{MeOH}$ 238 mμ

Alternatively, the compound of this example is prepared by the following procedures B and C.

B. *9α,11β - dichloro - 21 - iodo - 17α - hydroxyprogesterone.*—In the manner described in Example 3A, 1 g. of 17α-hydroxy-21-iodo-4,9(11)-pregnadiene-3,20-dione (the compound of Example 1) is chlorinated with 160 mg. of chlorine gas in carbon tetrachloride in the presence of 0.2 ml. of pyridine and the resultant product isolated and purified to give 9α,11β-dichloro-21-iodo-17α-hydroxyprogesterone.

C. *9α,11β - dichloro - 21 - iodo - 17α - hydroxyprogesterone 17 - acetate.*—The 9α,11β-dichloro-17α-hydroxy compound of Example 3B is esterified to the corresponding 17-acetate by means of acetic acid and trifluoroacetic anhydride in the manner described in Example 2 to give 9α,11β-dichloro-21-iodo-17α-hydroxyprogesterone 17-acetate.

EXAMPLE 4

*17α-hydroxy-21-fluoro-4,9(11)-pregnadiene-3,20-dione*

To 5 g. of 17α-hydroxy-21-iodo-4,9(11)-pregnadiene-3,20-dione (prepared as in Example 1) dissolved in 100 ml. of acetonitrile containing 1 ml. of water, there is added a 50% aqueous solution of 1.5 g. of silver fluoride. The mixture is warmed at 30–40° C. for four hours, then filtered. The filtrate is poured into water. The resulting solid is filtered and crystallized from acetone-hexane to give 17α-hydroxy-21-fluoro-4,9(11)-pregnadiene-3,20-dione, $\lambda_{max.}^{MeOH}$ 239 mμ

EXAMPLE 5

*17α-hydroxy-21-fluoro-4,9(11)-pregnadiene-3,20-dione 17-acetate*

In the manner described in Example 2 17α-hydroxy-21-fluoro-4,9(11)-pregnadiene-3,20-dione (the compound of Example 4) is reacted with acetic acid and trifluoroacetic anhydride and the resultant product isolated and purified to give 17α-hydroxy-21-fluoro-4,9(11)-pregnadiene-3,20-dione 17-acetate.

EXAMPLE 6

*17α-hydroxy-21-fluoro-4,9(11)-pregnadiene-3,20-dione 17-caproate*

A mixture of 1 g. of 17α-hydroxy-21-fluoro-4,9(11)-pregnadiene-3,20-dione (the compound of Example 4) and 5 ml. of caproic acid is heated at 80° C. in the presence of 1 ml. of trifluoroacetic anhydride for 45 minutes. The mixture is poured into ice-water and the excess acid neutralized with sodium carbonate. The crude reaction mixture is extracted with methylene chloride. The organic extracts are combined and concentrated to a residue which is chromatographed on Florisil. The material eluted with 10–30% ether in hexane is combined and crystallized from hexane to give 17α-hydroxy-21-fluoro-4,9(11)-pregnadiene-3,20-dione 17-caproate.

EXAMPLE 7

*9α,11β-dichloro-21-fluoro-17α-hydroxyprogesterone 17-acetate*

A. A solution of 1 g. of 17α-hydroxy-21-fluoro-4,9(11)-pregnadiene-3,20-dione 17-acetate (the compound of Example 5) and 4 g. of lithium chloride in 50 ml. of glacial acetic acid is cooled to about 10° C. and there is added 200 mg. of hydrogen chloride in 1 ml. of tetrahydrofuran followed by 360 mg. of N-chlorosuccinimide. The solution is stirred at room temperature for 20 minutes in the absence of light, then is poured into ice-water with stirring. A precipitate forms which is filtered, washed with water, triturated with ether and crystallized from acetone-hexane to give 9α,11β-dichloro-21-fluoro-17α-hydroxyprogesterone 17-acetate, $\lambda_{max.}^{MeOH}$ 238 mμ

Alternatively, the compound of this example is prepared according to the following procedures B and C.

B. *9α,11β - dichloro - 21 - fluoro - 17α - hydroxyprogesterone.*—One gram of 17α-hydroxy-21-fluoro-4,9(11)-pregnadiene-3,20-dione (the compound of Example 4) is chlorinated with 210 mg. of chlorine in carbon tetrachloride in the presence of 0.6 ml. of pyridine in the manner described in Example 3B. The resultant product is isolated and purified in the described manner to give 9α,11β-dichloro-21-fluoro-17α-hydroxyprogesterone.

C. *9α,11β - dichloro - 21 - fluoro - 17α - hydroxyprogesterone 17 - acetate.*—The 9α,11β-dichloro-17α-hydroxy of Example 7B is esterified to the corresponding 17-acetate by means of acetic acid and trifluoroacetic anhydride in the manner described in Example 2 to give 9α,11β-dichloro-21-fluoro-17α-hydroxyprogesterone 17-acetate.

A third alternative method of preparing the compound of this example is shown in the following procedure.

D. One gram of 21-fluoro-17α-hydroxy-4,9(11)-pregnadiene-3,20-dione 17 acetate (the compound of Example 5) and 780 mg. of iodobenzene dichloride are dissolved in 25 ml. of methylene chloride. The solution is stirred for 5 hours at room temperature, then concentrated in vacuo to a residue which is crystallized from acetone-hexane to give 9α,11β-dichloro-21-fluoro-17α-hydroxyprogesterone 17-acetate.

EXAMPLE 8

*9α-bromo-11β-chloro-21-fluoro-17α-hydroxyprogesterone 17-acetate*

One gram of 17α-hydroxy-21-fluoro-4,9(11)-pregnadiene-3,20-dione 17-acetate (the compound of Example 5) and 4 g. of lithium chloride are dissolved in 40 ml. of glacial acetic acid. The solution is cooled to about 10° C. and there is added 250 mg. of hydrogen chloride in 1 ml. of tetrahydrofuran followed by 370 mg. of N-bromoacetamide. The solution is stirred at room temperature for 20 minutes in the absence of light, then is poured into ice-water with stirring. A precipitate forms which is filtered, washed with water, triturated with ether and crystallized from acetone-hexane to give 9α-bromo-11β-chloro-21-fluoro-17α-hydroxyprogesterone 17-acetate, $\lambda_{max.}^{MeOH}$ 241 mμ

Alternatively, the compound of this example is prepared by reacting 17α-hydroxy-21-fluoro-4,9(11)-pregnadiene-3,20-dione (the compound of Example 4) with N-bromoacetamide and hydrogen chloride in the presence of lithium chloride in the manner described above in this example to give 9α-bromo-11β-chloro-21-fluoro-17α-hydroxyprogesterone which, in turn, is esterified to the corresponding 17-acetate by means of acetic acid and trifluoroacetic anhydride in the manner described in Example 2 to give 9α-bromo-11β-chloro-21-fluoro-17α-hydroxyprogesterone 17-acetate.

EXAMPLE 9

*9α-bromo-11β,21-difluoro-17α-hydroxyprogesterone 17-acetate*

500 mg. of 17α-hydroxy-21-fluoro-4,9(11)-pregnadiene-3,20-dione 17-acetate (the compound of Example 5) is dissolved in 25 ml. of diethylacetic acid and there is added a solution of 600 mg. of hydrogen fluoride in 2.5 ml. of a chloroform-tetrahydrofuran mixture followed by 185 mg. of N-bromoacetamide. The solution is stirred at room temperature for 1½ hours, poured into potassium carbonate solution with vigorous stirring and then is extracted with methylene chloride. The organic extracts are combined, washed with 5% sodium hydroxide and water, dried over magnesium sulfate, filtered and concentrated to a residue which is crystallized from methylene chloride-pentane to give 9α-bromo-11β,21-difluoro-17α-hydroxyprogesterone 17-acetate.

Alternatively, the compound of this example is prepared by reacting 17α-hydroxy-21-fluoro-4,9(11)-pregnadiene-3,20-dione (the compound of Example 4) with N-bromoacetamide and hydrogen fluoride in diethylacetic acid in the manner described above in this example to give 9α-bromo-11β,21-difluoro-17α-hydroxyprogesterone, which, in turn, is esterified by means of acetic acid and trifluoroacetic anhydride in the manner of Example 2 to give 9α-bromo-11β,21-difluoro-17α-hydroxyprogesterone 17-acetate.

EXAMPLE 10

*9α-chloro-11β,21-difluoro-17α-hydroxyprogesterone 17-acetate*

500 mg. of 17α-hydroxy-21-fluoro-4,9(11)-pregnadiene-3,20-dione (the compound of Example 5) is dissolved in 25 ml. of diethylacetic acid and there is added 180 mg. of N-chlorosuccinimide followed by a solution of 760 mg. of hydrogen fluoride in 4 ml. of a mixture of tetrahydrofuran and chloroform. The reaction mixture is stirred at room temperature for 48 hours, then is poured into an aqueous sodium carbonate solution and extracted with methylene chloride. The organic extracts are combined and evaporated to a residue which is chromatographed on Florisil. The product eluted with 20–40% ether in hexane is combined and crystallized from methylene chloride-hexane to give 9α-chloro-11β,21-difluoro-17α-hydroxyprogesterone 17-acetate.

$\lambda_{max.}^{MeOH}$ 238 mμ

Alternatively, the compound of this example is prepared by reacting 17α-hydroxy-21-fluoro-4,9(11)-pregnadiene-3,20-dione (the compound of Example 4) with N-chlorosuccinimide and hydrogen fluoride in the manner described above in this example to give 9α-chloro-11β,21-difluoro-17α-hydroxyprogesterone which, in turn, is esterified by means of acetic acid and trifluoroacetic anhydride in the manner of Example 2 to give 9α-chloro-11β,21-difluoro-17α-hydroxyprogesterone 17-acetate.

EXAMPLE 11

*9α-iodo-11β-chloro-21-fluoro-17α-hydroxyprogesterone 17-acetate*

To 500 mg. of 17α-hydroxy-21-fluoro-4,9(11)-pregnadiene-3,20-dione 17-acetate (the compound of Example 5) dissolved in 20 ml. of acetic acid is added 295 mg. of N-iodosuccinimide and a solution of 49 mg. of hydrogen chloride in 1.7 ml. of tetrahydrofuran and 2.0 g. of lithium chloride. The mixture is stirred at room temperature for 20 minutes, then poured into water and extracted with methylene chloride. The organic extracts are washed with dilute aqueous sodium bicarbonate solution and then with water. The solution is dried over magnesium sulfate, filtered and concentrated in vacuo to a residue which is triturated with ether and then crystallized twice from acetone-hexane to give 9α-iodo-11β-chloro-21-fluoro-17α-hydroxyprogesterone 17-acetate.

Alternatively, the compound of this example is prepared by reacting 17α-hydroxy-21-fluoro-4,9(11)-pregnadiene-3,20-dione (the compound of Example 4) with N-iodosuccinimide and hydrogen chloride in the presence of lithium chloride in the manner described above in this example to give 9α-iodo-11β-chloro-21-fluoro-17α-hydroxyprogesterone which, in turn, is esterified by means of acetic acid and trifluoroacetic anhydride in the manner of Example 2 to give 9α-iodo-11β-chloro-21-fluoro-17α-hydroxyprogesterone 17-acetate.

The 9α,11β-dihalogeno-21-fluoro-17α-hydroxyprogesterones prepared in the alternative procedures of Examples 8 through 11 may be converted to other lower alkanoic esters by substituting lower alkanoic acids such as propionic, butyric or valeric for acetic acid according to the procedure of Example 2 to give the corresponding 17-esters, i.e. 17-propionate, 17-butyrate and 17-valerate of the compound of Examples 8 through 11.

EXAMPLE 12

*9α,11β-dichloro-21-fluoro-17α-hydroxyprogesterone 17-caproate*

One gram of 17α-hydroxy-21-fluoro-4,9(11)-pregnadiene-3,20-dione 17-caproate (the compound of Example 6) is reacted with 310 mg. of N-chlorosuccinimide in the presence of 150 mg. of hydrogen chloride and 4 g. of lithium chloride according to the procedure of Example 7A. The resultant product is isolated in the described manner and crystallized from ether to give 9α,11β-dichloro-21-fluoro-17α-hydroxyprogesterone 17-caproate.

Alternatively, the compound of this example is prepared from 9α,11β-dichloro-21-fluoro-17α-hydroxyprogesterone (the compound of Example 7B) upon esterification with caproic acid and trifluoroacetic anhydride in the manner described in Example 6.

EXAMPLE 13

*9α-bromo-11β,21-difluoro-17α-hydroxyprogesterone 17-caproate*

In the manner described in Example 9, 500 mg. of 17α-hydroxy-21-fluoro - 4,9(11) - pregnadiene-3,20-dione 17-caproate (the compounds of Example 6) is reacted with 160 mg. of N-bromoacetamide and 400 mg. of hydrogen fluoride in diethylacetic acid. The resultant product is isolated in the described manner and crystallized from ether to give 9α-bromo-11β,21-difluoro-17α-hydroxyprogesterone 17-caproate.

EXAMPLE 14

*17α-bromo-21-fluoro-4,9(11)-pregnadiene-3,20-dione*

A. *11β-hydroxy-17α-bromoprogesterone.*—A living culture of the organism *Curvularia lunata* (N.R.R.L. 2380)

is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

100 ml. of this medium is placed in each of several 300 ml. flasks. To each flask is added 50 mg. of 17α-bromoprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 11β-hydroxy-17α-bromoprogesterone.

B. *17α-bromo-4,9(11)-pregnadiene - 3,20 - dione.*—A mixture of 2 g. of 11β-hydroxy-17α-bromoprogesterone (prepared as in Example 14A) and 4 g. of dry lithium bromide in 50 ml. of glacial acetic acid is refluxed under anhydrous conditions for 30 minutes. The solution is then cooled and poured into ice-water. A solid precipitates which is filtered, washed well with water, and recrystallized twice from acetone-hexane to give 17α-bromo-4,9(11)-pregnadiene-3,20-dione.

C. *17α -bromo - 21 - iodo - 4,9(11)-pregnadiene-3,20-dione.*—To a solution of 1.6 g. of 17α-bromo-4,9(11)-pregnadiene-3,20-dione (the compound of Example 14B) in a mixture of 12 ml. of tetrahydrofuran and 7 ml. of methanol is added 2.4 g. of iodine and 2.4 g. of finely powdered calcium oxide. The mixture is stirred at room temperature for 3 hours, then poured into 250 ml. of cold water containing 10 ml. of acetic acid. The product is extracted with methylene chloride and the extracts washed with water and dried over magnesium sulfate. The solution is concentrated in vacuo to a residue substantially of 17α-bromo-21-iodo-4,9(11)-pregnadiene-3,20-dione. This 21-iodo compound is used without further purification in the procedure immediately following.

D. *17α - bromo - 21 - fluoro-4,9(11)-pregnadiene-3,20-dione.*—The 21 - iodopregnadiene prepared in Example 14C is dissolved in moist acetonitrile and reacted with 530 mg. of silver fluoride according to the procedure of Example 4. The resultant product is chromatographed on Florisil and the material eluted with 20–40% ether-in-hexane is combined and concentrated to a residue which is crystallized from acetone-hexane to give 17α-bromo-21-fluoro-4,9(11)-pregnadiene-3,20-dione.

EXAMPLE 15

*9α,11β-dichloro-17α-bromo-21-fluoroprogesterone*

500 mg. of 17α-bromo-21-fluoro-4,9(11)-pregnadiene-3,20-dione (prepared as in Example 14) is reacted with 170 mg. of N-chlorosuccinimide in the presence of hydrogen chloride and lithium chloride according to the procedure of Example 7A. The resultant product is isolated in the described manner and crystallized from acetone-hexane to give 9α,11β - dichloro - 17α - bromo-21-fluoroprogesterone.

EXAMPLE 16

*9α,17α-dibromo-11β,21-difluoroprogesterone*

500 mg. of 17α-bromo-21-fluoro-4,9(11)-pregnadiene-3,20-dione (the compound of Example 14) is reacted with 175 mg. of N-bromoacetamide in the presence of hydrogen fluoride in diethylacetic acid according to the procedure of Example 9. The resultant product is isolated in the described manner and crystallized from methylene chloride-hexane to give 9α,17α-dibromo-11β,21-difluoroprogesterone.

EXAMPLE 17

*17α-hydroxy-21-iodo-1,4,9(11)-pregnatriene-3,20-dione*

Five grams of 17α-hydroxy - 21 - iodo-4,9(11)-pregnadiene-3,20-dione (the compound of Example 1) is fermented with *Corynebacterium simplex* (A.T.C.C. 6946) according to the procedure of U.S. Patent No. 2,837,464 as follows:

A 100 ml. broth culture containing a 0.1% yeast extract concentration, 9.0 ml. of 0.2 M KH₂PO₄ and 9.0 ml. of 0.2 M Na₂HPO₄, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 17α-hydroxy-21-iodo-4,9(11)-pregnadiene-3,20-dione in 5.0 ml. acetone is inoculated with the 24 hour culture *Corynebacterium simplex* (A.T.C.C. 6946). The culture-containing steroid solution is incubated for 48 hours at 28 to 30° C.

After termination of the transformation period, the pH is 7.2–7.3, the culture is now directly extracted with 3 equal volumes of CHCl₃, the solvent volumes combined and concentrated on a steam bath to a residue which is crystallized from actone hexane to give 17α-hydroxy-21-iodo-1,4,9(11)-pregnatriene-3,20-dione.

EXAMPLE 18

*9α,11β-dichloro-21-iodo-17α-hydroxy-1,4-pregnadiene-3,20-dione 17-acetate*

A. One gram of 17α-hydroxy-21-iodo-1,4,9(11)-pregnatriene-3,20-dione 17-acetate (prepared from the compound of Example 2 in the manner of Example 17) is chlorinated with chlorine in carbon tetrachloride in the presence of pyridine in the manner described in Example 3A. The resultant product is isolated and purified in the described manner to give 9α,11β-dichloro-21-iodo-17α-hydroxy-1,4-pregnadiene-3,20-dione 17-acetate.

Alternatively, the compound of this example is prepared according to the following procedures B and C.

B. *9α,11β-dichloro - 21 - iodo - 17α - hydroxyprogesterone.*—One gram of 17α-hydroxy-21-iodo-1,4,9(11)-pregnatriene-3,20-dione (the compound of Example 17) is chlorinated with chlorine gas in carbon tetrachloride in the presence of pyridine in the manner described in Example 3B. The resultant product is isolated and purified in the described manner to give 9α,11β-dichloro-21-iodo-17α-hydroxyprogesterone.

Alternatively, the compound of this example is prepared by subjecting 9α,11β-dichloro-21-iodo-17α-hydroxyprogesterone (the compound of Example 3B) to the action of a culture of a microorganism *Corynebacterium simplex* in the manner described in Example 17.

C. *9α,11β - dichloro - 21-iodo-17α-hydroxy-1,4-pregnadiene-3,20-dione 17 acetate.*—9α,11β-dichloro-21-iodo-17α-hydroxy-1,4-pregnadiene-3,20-dione (the compound of Example 18B) is esterified by means of acetic acid and trifluoracetic anhydride in the manner described in Example 2 to give 9α,11β-dichloro-21-iodo-17α-hydroxy-1,4-pregnadiene-3,20-dione 17-acetate.

Similarly, by substituting other lower alkanoic acids such as propionic, butyric or valeric for acetic acid in the above procedure, the corresponding 17-esters are prepared, i.e. the 17-propionate, 17-butyrate and 17-valerate, respectively of 9α,11β-dichloro-21-iodo-17α-hydroxy-1,4-pregnadiene-3,20-dione.

A second alternative procedure of the preparation of this example is shown in following procedure D.

D. 9α,11β - dichloro - 21-iodo-17α-hydroxyprogesterone 17-acetate (the compound of Example 3A) is subjected to the action of a culture of the microorganism *Corynebacterium simplex* in the manner described in Example 17. The resultant product is isolated and purified in the described manner to give 9α,11β-dichloro-21-iodo-17α-hydroxy-1,4-pregnadiene-3,20-dione 17-acetate.

In like manner, the compounds of Examples 7, 13, 15 and 16 are subjected to the action of a culture of *Corynebacterium simplex* to give 9α,11β-dichloro-21-fluoro-17α-hydroxy - 1,4 - pregnadiene - 3,20-dione 17-acetate, 9α-bromo-11β,21-difluoro-17α-hydroxy-1,4-pregnadiene-3,20-dione 17-caproate, 9α,11β-dichloro-17α-bromo-21-fluoro-1,4-pregnadiene-3,20-dione, and 9α-17α-dibromo-11β,21-difluoro-1,4-pregnadiene-3,20-dione, respectively.

EXAMPLE 19

*9α,11β - dichloro-21-fluoro-17α-hydroxy-1,4-pregnadiene-3,20-dione 17-acetate*

A. 17α-hydroxy-21-fluoro-1,4,9(11)-pregnatriene-3,20-dione 17-acetate (prepared from the compound of Example 5 by the process of Example 17) is reacted with N-chlorosuccinimide and hydrogen chloride in the presence of lithium chloride in the manner described in Example 7A. The resultant product is isolated and purified in the described manner to give 9α-11β-dichloro-21-fluoro-17α-hydroxy-1,4-pregnadiene-3,20-dione 17-acetate.

Alternatively, the compound of this example is prepared according to the following procedures B and C.

B. *9α,11β - dichloro-21-fluoro-17α-hydroxy-1,4-pregnadiene-3,20-dione.*—9α,11β - dichloro - 21-fluoro-17α-hydroxyprogesterone (the compounds of Example 7B) is subjected to the action of a culture of the microorganism *Corynebacterium simplex* in the manner described in Example 17 and the resultant product isolated and purified to give 9α,11β-dichloro-21-fluoro-17α-hydroxy-1,4-pregnadiene-3,20-dione.

C. *9α,11β - dichloro-21-fluoro-17α-hydroxy-1,4-pregnadiene-3,20-dione 17-acetate.*—In the manner described in Example 2, 9α,11β-dichloro-21-fluoro-17α-hydroxy-1,4-pregnadiene-3,20-dione (the compound of Example 19B) is reacted with acetic acid and trifluoroacetic anhydride to give 9α,11β-dichloro-21-fluoro-17α-hydroxy-1,4- pregnadiene-3,20-dione 17-acetate.

Similarly, by substituting other lower alkanoic acids such as propionic, butyric or valeric for acetic acid in the above procedure, the corresponding 17-esters are prepared, i.e., the 17-propionate, 17-butyrate and 17-valerate of 9α,11β-dichloro-21-fluoro-17α-hydroxy-1,4-pregnadiene-3,20-dione.

In a similar manner, a 9α,11β-dihalogeno-17α-hydroxyprogesterone (prepared as described in the alternative procedures of Examples 8 through 11) are converted by the action of *Corynebacterium simplex* to the corresponding 1-dehydro analogs to give respectively, 9α-bromo-11β-chloro-21-fluoro-17α-hydroxy-1,4-pregnadiene-3,20-dione, 9α - bromo-11β,21difluoro-17α-hydroxy-1,4-pregnadiene-3,20 - dione, 9α-chloro-11β,21-difluoro-17α-hydroxy-1,4-pregnadiene-3,20-dione, and 9α-iodo-11β-chloro-21-fluoro-17α-hydroxy-1,4-pregnadiene-3,20-dione.

The 17α-hydroxy analogs may then be esterified by means of a lower alkanoic acid and trifluoroacetic anhydride in the manner described in Example 2 to yield the corresponding 17-alkanoate esters.

The following examples show the preparation of starting materials containing a Δ9,11-bond and a 6α-methyl group; said starting materials being utilized in the halogenation reactions to provide the final products of this invention.

EXAMPLE 20

*6α - methyl - 17α - hydroxy-21-iodo-4,9(11)-pregnadiene-3,20-dione*

A. *6α - methyl-17α,21-dihydroxy-4,9(11)-pregnadiene-3,20-dione 21-acetate.*—A solution of 5.0 g. of 6α-methylhydrocortisone acetate in a mixture of 20 ml. of dimethylformamide and 5 ml. of dry pyridine is chilled in an ice bath and there is added dropwise a solution of 3.2 g. of methanesulfonyl chloride in 30 ml. of dimethylformamide. Stirring is continued at room temperature for 28 hours after which the mixture is poured into icewater. A precipitate forms which is filtered, washed with water and crystallized from acetone-hexane to give 6α - methyl - 17α,21-dihydroxy-4,9(11)-pregnadiene-3,20-dione 21-acetate.

B. *6α - methyl-17α,21-dihydroxy-4,9(11)-pregnadiene-3,20-dione.*—A mixture of 2.0 g. of the pregnadiene of Example 20A and 100 ml. of 0.27 N methanolic perchloric acid is stirred at room temperature for 18 hours. The reaction mixture is poured into water and the precipitate which forms is filtered and recrystallized from acetone to give 6α-methyl-17α,21-dihydroxy-4,9(11)-pregnadiene-3,20-dione.

C. *6α - methyl-17α,21-dihydroxy-4,9(11)-pregnadiene-3,20-dione 21-methanesulfonate.*—A solution of 10 g. of 6α - methyl - 17α,21-dihydroxy-4,9(11)-pregnadiene-3,20-dione in 200 ml. of dry pyridine is cooled to 0° C. and there is added a solution of 4 ml. of methanesulfonyl chloride in 20 ml. of chloroform. The mixture is kept at 0° C. for 3 hours, then the excess methanesulfonyl chloride is decomposed by the addition of a small amount of ice. The mixture is diluted with chloroform and washed with dilute hydrochloric acid and water. The organic solution is dried over magnesium sulfate, filtered and evaporated in vacuo to a residue which is crystallized from acetone-ether to give 6α-methyl-17α,21-dihydroxy-4,9(11)-pregnadiene-3,20-dione 21-methanesulfonate.

D. *6α - methyl - 17α - hydroxy-21-iodo-4,9(11)-pregnadiene-3,20-dione.*—A solution of 5 g. of the 21-methanesulfonate of Example 20C in 50 ml. of acetone containing a few drops of pyridine is warmed slightly and there is added a warm solution of 10 g. of sodium iodide in 20 ml. of acetone. The mixture is warmed on the steam bath for 5 minutes, then poured into cold water. A solid separates which is filtered, washed with water and crystallized from acetone-hexane to give 6α-methyl-17α-hydroxy-21-iodo-4,9(11)-pregnadiene-3,20-dione.

EXAMPLE 21

*6α-methyl-17α-21-iodo-4,9(11)-pregnadiene-3,20-dione 17-acetate*

A solution of 1 g. of 6α-methyl-17α-hydroxy-21-iodo-4,9(11)-pregnadiene-3,20-dione in 20 ml. of acetic acid and 4 ml. of trifluoroacetic anhydride is allowed to stand at room temperature for 16 hours and is then poured into ice water. A solid separates which is filtered, washed with water and crystallized from acetone-hexane to give 6α - methyl - 17α - hydroxy-21-iodo-4,9(11)-pregnadiene-3,20-dione 17-acetate.

Similarly, by substituting other lower alkanoic acids such as propionic, butyric or valeric for acetic acid in the above procedure, the corresponding 17-esters are prepared, i.e. the 17-propionate, 17-butyrate and 17-valerate, respectively of 6α-methyl-17α-hydroxy-21-iodo-4,9(11)-pregnadiene-3,20-dione.

EXAMPLE 22

*6α-methyl-17α-hydroxy-21-fluoro-4,9(11)-pregnadiene-3,20-dione 17-acetate*

Five grams of 6α-methyl- 17α - hydroxy - 21 - fluoro-4,9(11)-pregnadiene-3,20-dione is reacted with acetic acid and trifluoroacetic anhydride according to the procedure of Example 21. The resultant product is isolated in the described manner and crystallized from acetone-hexane to give 6α-methyl-17α-hydroxy-21-fluoro-4,9(11)-pregnadiene-3,20-dione 17-acetate.

EXAMPLE 23

*6α-methyl-17α-hydroxy-21-fluoro-4,9(11)-pregnadiene-3,20-dione 17-caproate*

A mixture of 1 g. of 6α-methyl-17α-hydroxy-21-fluoro-4,9(11)-pregnadiene-3,20-dione and 5 ml. of caproic acid is heated at 80° C. in the presence of 1 ml. of trifluoroacetic anhydride for 45 minutes. The mixture is poured into ice water and the excess acid neutralized with sodium carbonate. The crude extracts are combined and concentrated to a residue which is chromatographed on Florisil. The material eluted with 12–35% ether in hexane is combined and crystallized from hexane to give 6α-methyl - 17α - hydroxy-21-fluoro-4,9(11)-pregnadiene-3,20-dione 17-caproate.

EXAMPLE 24

*6α-methyl-17α-bromo-4,9(11)-pregnadiene-3,20-dione*

A. *17α-bromoprogesterone 3,20-bisethylene ketal.*—17α-bromoprogesterone (30 g.) in 1 liter of dry benzene and 400 ml. of ethylene glycol is refluxed under a Dean-Stark separator for 18 hours in the presence of 500 mg. of p-toluene-sulfonic acid. The reaction mixture is diluted with water and the organic layer separated. The benzene solution is washed with 5% aqueous sodium bicarbonate and water, and concentrated to a residue under reduced pressure. Addition of ether to this residue gives a solid which is recrystallized from acetone-ether yielding a product substantially of 17α-bromoprogesterone 3,20-bisethylene ketal.

B. *5α,6α-epoxy - 17α - bromopregnane-3,20-dione 3,20-bisethylene ketal.*—To a solution of 20 g. of the bisethylene ketal of Example 30A in 320 ml. of chloroform containing 4 drops of pyridine is added with a solution of 14.7 g. of monoperphthalic acid in 200 ml. of ether at 0° C. The mixture is allowed to stand at 0° C. for 24 hours, then diluted with ether and washed three times with 5% aqueous bicarbonate and twice with water. The solution is dried over magnesium sulfate, filtered and the solvent removed in vacuo. The resultant residue is chromatographed on Florisil in hexane. The column is first eluted with 20–40% ether in hexane to separate the 5β,6β-epoxide of 17α-methylpregnane-3,20-dione 3,20-bisethylene ketal from the desired product. The column is then eluted with 100% ether and 1% acetone in ether, and the eluates concentrated in vacuo to a residue which is crystallized from acetone-hexane to give 5α,6α-epoxy-17α-bromopregnane-3,20-dione 3,20-bisethylene ketal.

C. *5α-hydroxy - 6β - methyl-17α-bromopregnane-3,20-dione.*—The 5α,6α-epoxy of Example 24B (100 g.) in 200 ml. of tetrahydrofuran and 200 ml. of benzene is added to a Grignard reagent prepared from 5 g. of magnesium and 15 ml. of methyl iodide in 200 ml. of ether. The ether is distilled off and the reaction mixture is refluxed for 19 hours. The mixture is chilled and an aqueous ammonium chloride solution added. The solvent layers are separated and the organic layer washed with water and concentrated. The resultant residue is dissolved in 200 ml. of 90% aqueous methanol, refluxed with 3 g. of oxalic acid for 30 minutes, then poured into water. A solid forms which is filtered and crystallized from acetone-hexane to give 5α-hydroxy-6β-methyl-17α-bromopregnane-3,20-dione.

D. *6α-methyl-17α-bromoprogesterone.*—Two grams of 5α - hydroxy - 6β - methyl-17α-bromopregnane-3,20-dione (the compound of Example 12C) in 150 ml. of ethanol containing 0.5 ml. of concentrated hydrochloric acid is refluxed for 30 minutes. The solution is then poured into water, the resultant solid filtered, and crystallized from aqueous methanol to give 6α-methyl-17α-bromoprogesterone.

E. *6α-methyl-17α-bromo-11β-hydroxyprogesterone.*—A living culture of the organism *Curvularia lunata* (N.R.R.L. 2380) is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

100 ml. of this medium is placed in each of several 300 ml. flasks. To each flask is added 50 mg. of the compound of Example 24D dissolved in a small volume of acetone. The mixture is shaken for a period of 7 days at a room temperature of about 28° C. The contents of the flasks are then combined and extracted with several portions of ethylene dichloride using one-fifth of the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 6α-methyl-17α-bromo-11β-hydroxyprogesterone.

F. *6α-methyl-17α-bromo - 4,9(11) - pregnadiene - 3,20-dione.* — 6α-methyl-17α-bromo-11β-hydroxyprogesterone (the compound of Example 24E) is reacted with methanesulfonyl chloride in dimethylformamide-pyridine in the manner described in Example 20A. The resultant product is isolated and purified in the described manner to give 6α-methyl-17α-bromo-4,9(11)-pregnadiene-3,20-dione.

EXAMPLE 25

*6α-methyl-17α-bromo-21-fluoro-4,9(11)-pregnadiene-3,20-dione*

A. *6α-methyl-17α-bromo-21-iodo-4,9(11)-pregnadiene-3,20-dione.* — Two grams of 6α-methyl-17α-bromo-4,9(11)-pregnadiene-3,20-dione (the compound of Example 24) is reacted with 3 g. of iodine and 3 g. of calcium oxide in the manner of Example 14. The resultant product is isolated in the described manner and used without further purification in the following procedure.

B. *6α-methyl-17α-bromo-21-fluoro - 4,9(11) - pregnadiene-3,20-dione.*—The 21-iodo-4,9(11)-pregnadiene prepared as in Example 25A is reacted with 630 mg. of silver fluoride in the manner of Example 15. The resultant product is isolated in the described manner and crystallized from acetone-hexane to give 6α-methyl-17α-bromo-21-fluoro-4,9(11)-pregnadiene-3,20-dione.

EXAMPLE 26

*6α-methyl-17α-hydroxy-21-iodo-1,4,9(11)-pregnatriene-3,20-dione*

Five grams of 6α-methyl-17α-hydroxy-21-iodo-4,9(11)-pregnadiene-3,20-dione is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M KH$_2$PO$_4$ and 9.0 ml. 0.2 M Na$_2$HPO$_4$ contained in a 300 ml. Erlenmeyer flask, is seeded with 1 ml. of a 24-hour broth culture of *Corynebacterium simplex*. The flask is incubated at 28° C. for 24 hours. A second 300 ml. Erlenmeyer flask containing 150 mg. of sterile 6α-methyl-17α-hydroxy-21-iodo-4,9(11)-pregnadiene-3,20-dione (the compound of Example 20) in 5.0 ml. of acetone is inoculated with the 24-hour culture of *Corynebacterium simplex*. The culture-containing steroid solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α-methyl-17α-hydroxy-21-iodo-1,4,9(11)-pregnatriene-3,20-dione.

In similar manner,

6α-methyl-9α-bromo-11β-chloro-21-fluoro-17α-hydroxy-1,4-pregnadiene-3,20-dione 17-acetate,
6α-methyl-9α-bromo-11β,21-difluoro-17α-hydroxy-1,4-pregnadiene-3,20-dione 17-acetate,
6α-methyl-9α-iodo-11β-chloro-21-fluoro-17α-hydroxy-1,4-pregnadiene-3,20-dione 17 acetate,
6α-methyl-9α,11β-dichloro-21-fluoro-17α-hydroxy-1,4-pregnadiene-3,20-dione 17-caproate,
6α-methyl-9α-bromo-11β,21-difluoro-17α-hydroxy-1,4-pregnadiene-3,20-dione 17-caproate,
6α-methyl-9α-bromo-11β-chloro-21-fluoro-17α-hydroxy-1,4-pregnadiene-3,20-dione,
6α-methyl-9α-bromo-11β,21-difluoro-17α-hydroxy-1,4-pregnadiene-3,20-dione,
6α-methyl-9α-iodo-11β-chloro-21-fluoro-17α-hydroxy-1,4-pregnadiene-3,20-dione are prepared.

This application is a continuation-in-part of application Serial No. 817,032, filed June 1, 1959, now abandoned, and Serial No. 817,055 filed June 1, 1959.

We claim:

1. Compounds of the group consisting of 6-W-9α-X-11β-Y-17α-R-21-Z - progesterones, 6-W-9α-X-11β-Y-17α-R-21-Z-19-norprogesterones and 6-W-9α-X-11β-Y-17α-R-21-Z-1-dehydroprogesterones wherein X is a halogen having an atomic weight greater than 19; Y is a halogen having an atomic weight less than 126 and being at least as electronegative as X; Z is halogen; R is a member of the group consisting of bromine, hydroxy, and acyloxy radicals of hydrocarbon carboxylic acids containing up to 12 carbon atoms and W is a member of the group consisting of hydrogen and methyl.

2. 9α-X-11β-Y-17α-R-21-Z-progesterone wherein X is a halogen having an atomic weight greater than 19; Y is a halogen having an atomic weight less than 126 and being at least as electronegative as X; Z is halogen; and R is an acyloxy radical of a hydrocarbon carboxylic acid containing up to 12 carbon atoms.

3. 9α-X-11β-Y-17α- R - 21 - Z - 1 - dehydroprogesterone wherein X is a halogen having an atomic weight greater than 19; Y is a halogen having an atomic weight less than 126 and being at least as electronegative as X; Z is halogen; and R is an acyloxy radical of a hydrocarbon carboxylic acid containing up to 12 carbon atoms.

4. 9α-X-11β-Y-21-Z-17α-hydroxyprogesterone wherein X is a halogen having an atomic weight greater than 19; Y is a halogen having an atomic weight less than 126 and being at least as electronegative as X; and Z is halogen.

5. 9α-X-11β-Y-21-Z- 17α - hydroxy-1-dehydroprogesterone wherein X is a halogen having an atomic weight greater than 19; Y is a halogen having an atomic weight less than 126 and being at least as electronegative as X; and Z is halogen.

6. 9α-X-11β-Y-21-Z-6-methyl-17α-hydroxyprogesterone wherein X is a halogen having an atomic weight greater than 19; Y is a halogen having an atomic weight less than 126 and being at least as electronegative as X; and Z is halogen.

7. 9α-X-11β-Y-21-Z-6-methyl-17α-hydroxy-1 - dehydroprogesterone wherein X is a halogen having an atomic weight greater than 19; Y is a halogen having an atomic weight less than 126 and being at least as electronegative as X; and Z is halogen.

8. 9α-X-11β-Y-17α-R-21-Z-6-methylprogesterone wherein X is a halogen having an atomic weight greater than 19; Y is a halogen having an atomic weight less than 126 and being at least as electronegative as X; Z is halogen; and R is an acyloxy radical of a hydrocarbon carboxylic acid containing up to 12 carbon atoms.

9. 9α-X-11β-Y-17α-R-21-Z-6 - methyl-1-dehydroprogesterone wherein X is a halogen having an atomic weight greater than 19; Y is a halogen having an atomic weight less than 126 and being at least as electronegative as X; Z is halogen; and R is an acyloxy radical of a hydrocarbon carboxylic acid containing up to 12 carbon atoms.

10. 6α-methyl-9α,11β-dichloro-21-fluoro-17α-hydroxyprogesterone 17-acetate.

11. 6α-methyl-9α,11β-dichloro-21-fluoro-17α-hydroxy-1-dehydroprogesterone 17-acetate.

12. 6α-methyl-9α,11β-dichloro-21-fluoro-17α-hydroxyprogesterone 17-caproate.

13. 6α-methyl-9α-bromo-11β-chloro-21-fluoro-17α-hydroxyprogesterone 17-acetate.

14. 6α-methyl-9α-bromo-11β,21-difluoro-17α-hydroxyprogesterone 17-acetate.

15. 6α-methyl-9α-bromo-11β-chloro-21-fluoro-17α-hydroxy-1-dehydroprogesterone.

16. 9α,11β-dichloro-21-fluoro-17α-hydroxyprogesterone 17-acetate.

17. 9α,11β-dichloro-21-fluoro-17α-hydroxyprogesterone 17-caproate.

18. 9α,11β-dichloro-21-iodo-17α-hydroprogesterone 17-acetate.

19. 9α-bromo-11β-chloro-21-fluoro-17α-hydroxyprogesterone 17-acetate.

20. 9α-bromo-11β,21-difluoro-17α-hydroxyprogesterone 17-acetate.

21. 9α-chloro-11β,21-difluoro-17α-hydroxyprogesterone 17-acetate.

22. 9α,11β-dichloro-21-fluoro-17α-hydroxy-1-dehydroprogesterone 17-acetate.

23. 9α,11β-dichloro-21-iodo-17α-hydroxy-1-dehydroprogesterone 17-acetate.

24. 17α - R - 21 - Z - 1,9(11) - bis-dehydroprogesterones wherein R is a member of the group consisting of bromine, hydroxy and acyloxy radicals of hydrocarbon carboxylic acids containing up to 12 carbon atoms; and Z is halogen.

25. A compound selected from the group consisting of 6α-methyl-17α-hydroxy-21-iodo-1,9(11)-bis - dehydroprogesterone and the 17-lower alkanoyl esters thereof.

26. A compound selected from the group consisting of 6α-methyl-17α-bromo-21-halogen - 9(11)-dehydroprogesterone and the 1-dehydro analog thereof.

No references cited.